(12) United States Patent
Kirscht et al.

(10) Patent No.: US 7,984,357 B2
(45) Date of Patent: Jul. 19, 2011

(54) IMPLEMENTING MINIMIZED LATENCY AND MAXIMIZED RELIABILITY WHEN DATA TRAVERSES MULTIPLE BUSES

(75) Inventors: Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 11/741,194

(22) Filed: Apr. 27, 2007

(65) Prior Publication Data

US 2008/0270870 A1    Oct. 30, 2008

(51) Int. Cl.
*G11C 29/00* (2006.01)
(52) U.S. Cl. .................. 714/763; 714/5; 365/185.09
(58) Field of Classification Search .............. 714/5, 763; 365/185.09
See application file for complete search history.

(56) References Cited

U.S. PATENT DOCUMENTS

| | | | |
|---|---|---|---|
| 6,397,357 B1 * | 5/2002 | Cooper | 714/703 |
| 7,167,410 B2 * | 1/2007 | Boecker et al. | 365/230.06 |
| 7,461,320 B2 * | 12/2008 | Klein | 714/754 |
| 7,516,371 B2 * | 4/2009 | Sakaue et al. | 714/52 |
| 7,624,329 B2 * | 11/2009 | Syzdek et al. | 714/766 |
| 7,779,334 B2 * | 8/2010 | Earle et al. | 714/763 |

* cited by examiner

*Primary Examiner* — Esaw T Abraham
(74) *Attorney, Agent, or Firm* — Joan Pennington

(57) ABSTRACT

A memory controller and methods implement minimized latency and maximized reliability when data traverses multiple buses. The memory controller includes a dynamic random access memory (DRAM) error correcting code (ECC) checking and correcting circuit and a high speed bus (HSB) ECC checking and correcting circuit. In a first mode for implementing minimized latency, read data is applied directly to the DRAM ECC checking and correcting circuit, bypassing the HSB ECC checking and correcting circuit. In a second mode for implementing maximized reliability, the read data is applied through the HSB ECC checking and correcting circuit to the DRAM ECC checking and correcting circuit.

12 Claims, 3 Drawing Sheets

IMPLEMENTING MINIMIZED LATENCY AND MAXIMIZED RELIABILITY WHEN DATA TRAVERSES MULTIPLE BUSES

FIELD OF THE INVENTION

The present invention relates generally to the data processing field, and more particularly, relates to a memory controller and method for implementing minimized latency and maximized reliability when data traverses multiple buses.

DESCRIPTION OF THE RELATED ART

Current state of the art memory controllers typically use Error Correction Codes (ECC) for the read data path to allow detection and correction of errors in the data received from a dynamic random access memory (DRAM). In some prior art memory controllers, all data traversed through the DRAM ECC logic on its way back to the requesting agent.

U.S. patent application Ser. No. 11/116,624 filed Apr. 28, 2005, U.S. patent Publication No. US 2006-0248432 A1 published Nov. 2, 2006, to Wayne Barrett et al., and assigned to the present assignee, discloses an improved method for implementing processor bus speculative data completion in a computer system. A memory controller in the computer system sends uncorrected data from a memory to a processor bus. The memory controller also applies the uncorrected data to error correcting code (ECC) checking and correcting circuit. When a single bit error (SBE) is detected, corrected data is sent to the processor bus a predefined number of cycles after the uncorrected data. Sending the uncorrected data reduces latency of data transfers by at least one cycle, while effective SBE checking and correction is provided.

To support larger memory capacities, a memory controller architecture may utilize narrow high speed buses to and from a memory redrive module or repower chip. As the high speed buses increase in frequency, ECC or CRC coverage over the data is required for the high speed bus (HSB) for highly reliable systems. Adding such HSB ECC coverage can result in additional memory latency.

A need exists for an effective mechanism for implementing minimized latency and maximized reliability when data traverses multiple buses.

As used in the following description and claims, the term DRAM ECC should be understood to include ECC detection and correction for data received from a memory, such as DRAM, by a memory controller and applied to a processor bus.

As used in the following description and claims, the term HSB ECC should be understood to include ECC detection and correction in a memory controller for data received by a repower module from a memory bus, such as DRAM bus, and ECC generated and applied with the data to a high speed bus connected to the memory controller.

SUMMARY OF THE INVENTION

A principal aspect of the present invention is to provide a memory controller and method for implementing minimized latency and maximized reliability when data traverses multiple buses. Other important aspects of the present invention are to provide such a memory controller and method for implementing minimized latency and maximized reliability substantially without negative effect and that overcome some of the disadvantages of prior art arrangements.

In brief, a memory controller and method are provided for implementing minimized latency and maximized reliability when data traverses multiple buses. A memory controller includes a dynamic random access memory (DRAM) error correcting code (ECC) checking and correcting circuit and a high speed bus (HSB) ECC checking and correcting circuit. In a first mode for implementing minimized latency, read data is applied directly to the DRAM ECC checking and correcting circuit, bypassing the HSB ECC checking and correcting circuit. In a second mode for implementing maximized reliability, the read data is applied through the HSB ECC checking and correcting circuit to the DRAM ECC checking and correcting circuit. In the second mode, the HSB ECC checking and correcting circuit provides read data with HSB errors corrected to the DRAM ECC checking and correcting circuit.

In accordance with features of the invention, latency typically realized without using a HSB ECC checking and correcting circuit is maintained, while providing additional error coverage by the HSB ECC checking and correcting circuit. When a programmable threshold of HSB ECC errors is exceeded, dynamically switching to the second mode is provided where all accesses go through the HSB ECC checking and correcting circuit.

In accordance with features of the invention, recovery of an uncorrectable error is enabled when operating in the first mode bypassing the HSB ECC checking and correcting circuit. When an uncorrectable error is detected by the DRAM ECC checking and correcting circuit and a correctable error is reported by the HSB ECC checking and correcting circuit, then dynamically switching to the second mode is provided, and then the read request re-issue to the same memory port.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, methods are provided for implementing minimized latency and maximized reliability when data traverses multiple buses. While providing additional error coverage by providing a memory controller with a HSB ECC checking and correcting circuit, latency typically realized without using a HSB ECC checking and correcting circuit is maintained.

In accordance with features of the invention, a first mode is provided for implementing minimized latency, with read data being applied directly to a DRAM ECC checking and correcting circuit, bypassing the HSB ECC checking and correcting circuit. A second mode is provided for implementing maximized reliability, with read data being applied through the HSB ECC checking and correcting circuit to the DRAM ECC checking and correcting circuit. In the second mode, the HSB ECC checking and correcting circuit provides corrected read data to the DRAM ECC checking and correcting circuit.

Figure 1:
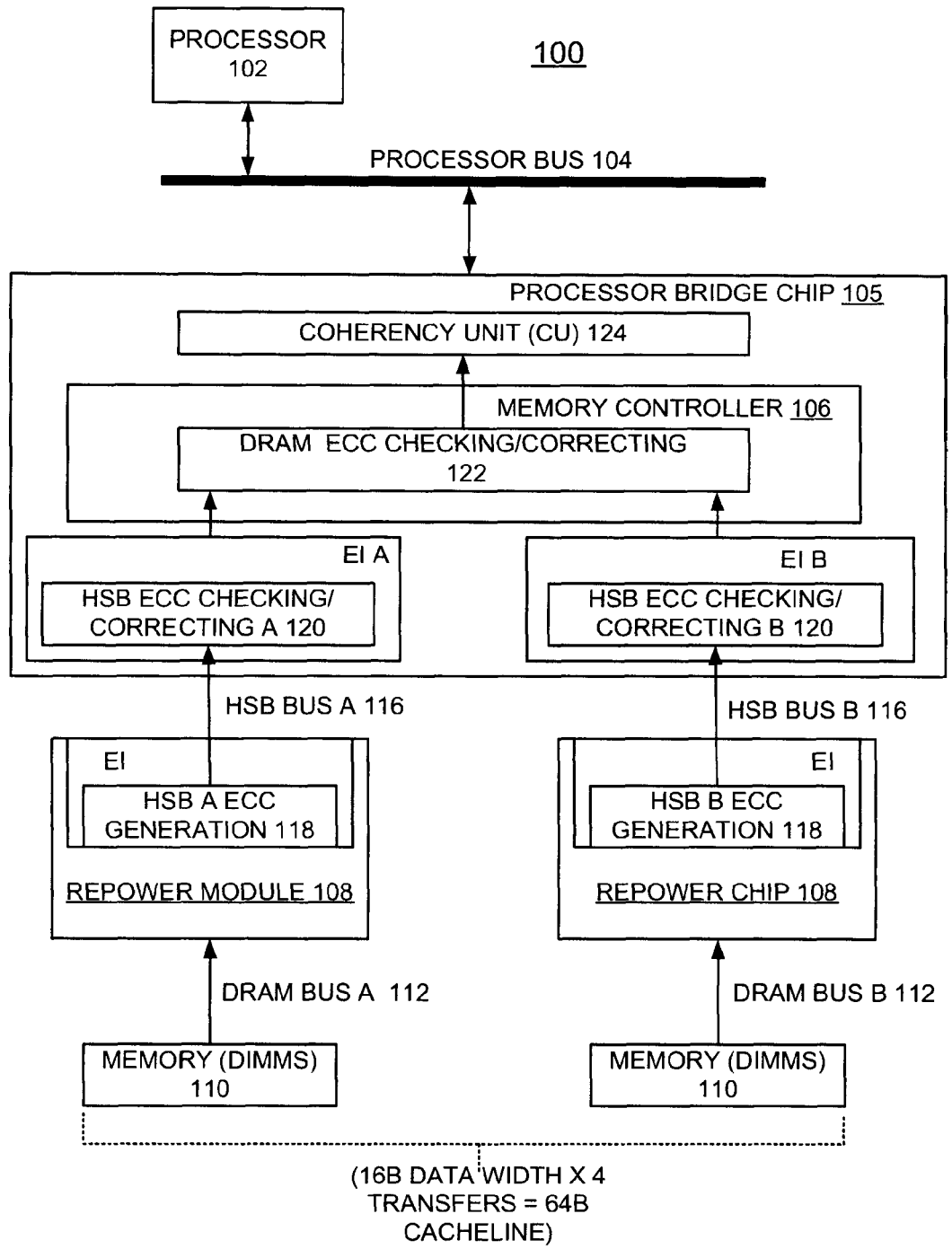
FIG. 1 is a block diagram illustrating a computer system including a memory controller and methods for implementing minimized latency and maximized reliability when data traverses multiple buses in accordance with the preferred embodiment.

Having reference now to the drawings, in FIG. 1, there is shown a computer system generally designated by the reference character 100 for implementing minimized latency and maximized reliability when data traverses multiple buses in accordance with the preferred embodiment.

Computer system 100 includes at least one main processor 102 coupled by a processor bus 104 to a processor bridge chip 105 containing a memory controller 106 in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, a plurality of main processors could be used.

Computer system 100 includes a pair of memory repower modules A and B, 108, a memory A and B, 110, such as DRAMs A and B, arranged as dual-inline memory modules (DIMMs), a DRAM bus A and B, 112 connecting the respective repower module A and B, 108 to the DRAM memory A and B, 110, and a respective narrow high speed bus (HSB) 116 coupling the memory controller 106 to the respective repower module, A, B, 108. Both DRAM bus 112 and HSB 116 have their own respective ECC coverage, DRAM ECC, and HSB ECC.

Each repower module, A, B, 108 includes an elastic interface (EI) containing a respective HSB ECC generation circuit A, B, 118. The HSB ECC generation circuits A, B, 118 receive read data from DRAM 110 and generate ECC or CRC for the received read data, and applies the received read data with the generated ECC to the respective narrow high speed bus (HSB) A, B, 116.

The memory controller 106 in accordance with the preferred embodiment is coupled to a HSB ECC checking/correcting circuit A, 120, and a HSB ECC checking/correcting circuit B, 120, each contained within a respective elastic interface EI A, EI B. The memory controller 106 in accordance with the preferred embodiment includes a DRAM ECC checking/correcting circuit 122 coupled to the HSB ECC checking/correcting circuits A, B, 120. The output of the DRAM ECC checking/correcting circuit 122 of the memory controller 106 is coupled to a coherency unit (CU) 124 contained within the processor bridge chip 105.

In accordance with features of the preferred embodiment, the memory controller 106 is arranged for implementing methods for minimizing latency and maximizing reliability with data traversing multiple buses 112, 116.

Both DRAM ECC checking/correction 122 and HSB ECC checking/correction A, B, 120 are performed on the read data received by the memory controller 106. The methods of the preferred embodiment allow the read data to bypass the HSB ECC checking/correction A, B, 120 during one mode, and to take the path through the HSB ECC checking/correction A, B, 120 during a second mode.

Figure 2:
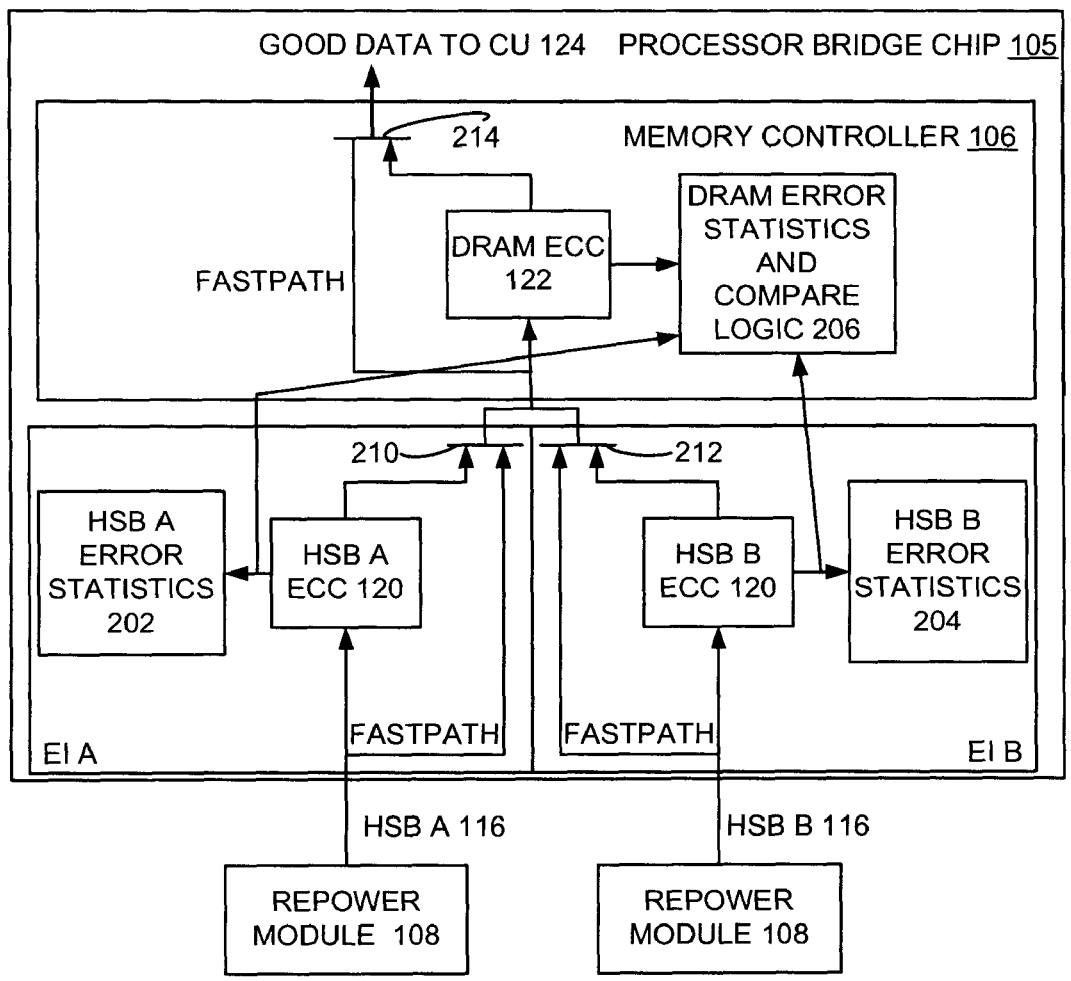
FIG. 2 is a functional block diagram illustrating a nested error correcting code (ECC) checking and correcting functional modes in accordance with the preferred embodiment.

Referring to FIG. 2, there is shown a functional block diagram illustrating a nested error correcting code (ECC) checking and correcting functional modes of memory controller 106 in accordance with the preferred embodiment. Memory controller 106 utilizes a plurality of error statistics modules including a HSB A error statistics module 202, a HSB B error statistics module 204, and a DRAM error statistics and compare logic 206 respectively coupled to the checking/correcting circuits HSB A ECC 120, HSB B ECC 120, and DRAM ECC 122 within the memory controller 106. Each of a plurality of multiplexers 210, 212, and 214 selectively couples either ECC corrected or uncorrected memory data with the uncorrected memory data applied along lines labeled FASTPATH.

Figure 3:
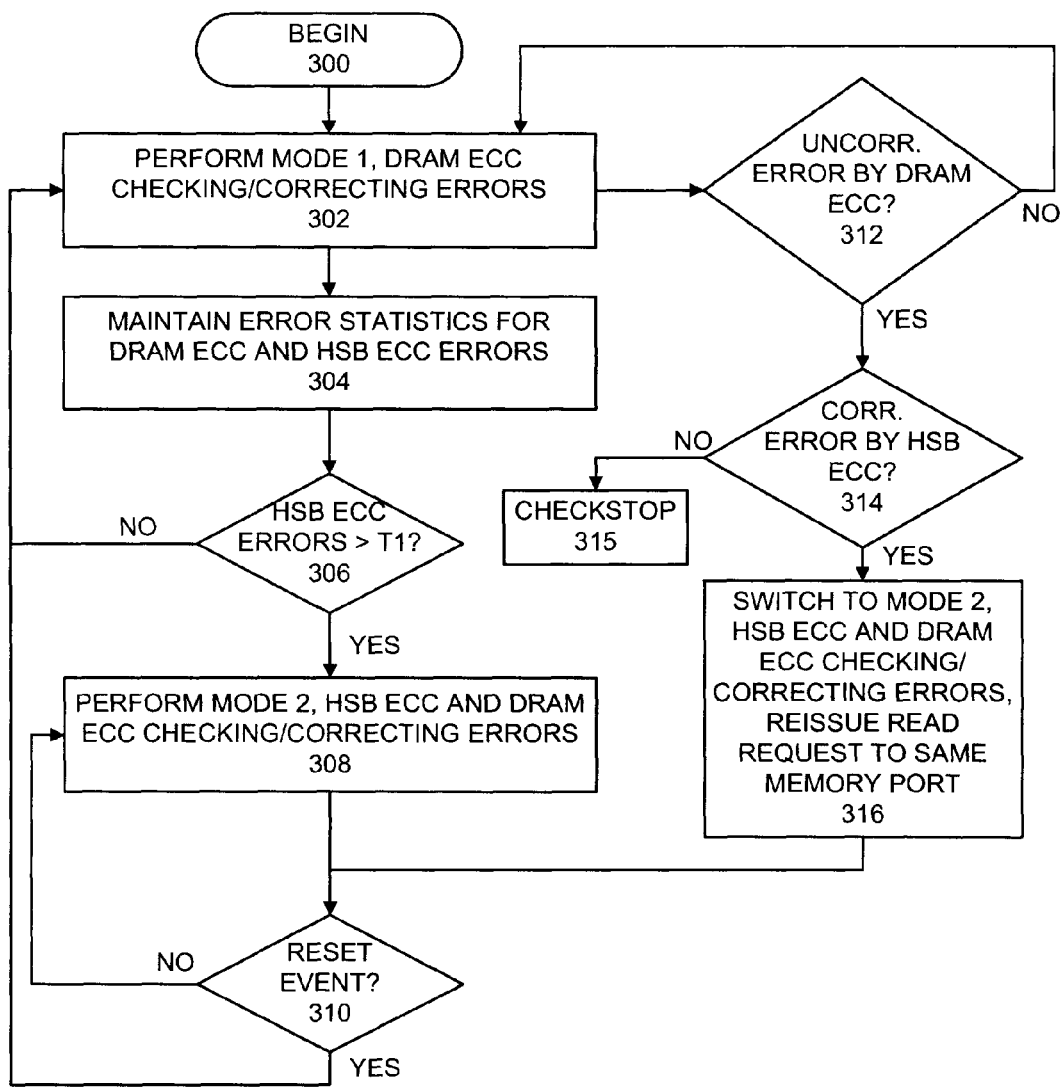
FIG. 3 is a flow chart illustrating exemplary steps of methods in accordance with the preferred embodiment.

Referring also to FIG. 3, there is shown a flow chart illustrating exemplary steps of methods in accordance with the preferred embodiment starting at a block 300.

As indicated at a block 302, in the first mode, the DRAM ECC can detect and correct errors that occur on both the DRAM bus 112 and each high speed bus A, B 116. Error Statistics are individually maintained for errors detected by both ECC schemes as indicated at a block 304. When a HSB ECC error is obtained, it is logged in the respective HSB error statistics 202, 204. Since the data is allowed to bypass the HSB ECC checking/correcting A, B, 120 and be presented directly to the DRAM ECC checking/correction 122, the DRAM ECC checking/correcting 122 will also detect the same error.

As illustrated in FIG. 2, both HSB Error checking/correcting A, B, 120 forward the error information to the DRAM Error Statistics and compare logic 206. In the memory controller 106, there is a symbol correspondence between the two ECC algorithms. This allows each HSB ECC symbol to be compared against the corresponding symbol of the DRAM ECC logged in the DRAM Error Statistics and compare logic 206, for example, via hardware mapping to optionally prevent the HSB Error from being logged in the DRAM Error Statistics and compare logic 206.

As indicated at a decision block 306, the HSB ECC errors are compared to a programmable threshold T1. If the programmable threshold T1 of HSB ECC errors is exceeded, a mechanism is provided to report the error, for example, to a System Management Interface (SMI Handler), not shown. Multiplexer controls are added to the hardware of memory controller 106 to allow dynamically switching to the second mode in which all accesses go through the HSB ECC checking/correcting A, B, 120, thus always providing corrected data free of any HSB errors to the DRAM ECC checking/correcting 122. The SMI Handler need only write a register bit. Upon sensing this register bit, the memory queuing logic blocks dispatch of any further read commands and allows all read commands previously dispatched to complete while continuing to queue incoming requests. Upon completion of all previously dispatched read commands, the mode bit to choose the second mode is set by the hardware and all corresponding programmable counters that trigger early read completion indication to the various source buses are updated.

Command traffic is then allowed to resume operating in the second mode as indicated at a block 308. For example, the process takes only a few cycles after the previously dispatched commands have been issued. Also the hardware of memory controller 106 can enable bypassing the SMI Handler intervention and immediately perform the switch from the first mode to the second mode when the programmable threshold T1 of HSB ECC errors is exceeded. Then providing an indication to the SMI Handler that the hardware had automatically intervened and performed the action. This has the added benefit that the evasive action resulting from the HSB ECC errors occurs much sooner to minimize the window of time in which the HSB ECC error could align with a DRAM ECC error, either hard or soft, creating an uncorrectable error.

When a reset event is identified as indicated at a decision block 310, then a switch from the second mode to the first mode is provided. For example, during the second mode error statistics optionally are individually maintained for errors detected by both ECC schemes. The reset event to switch from the second mode to the first mode includes, for example, a drop in the HSB ECC errors below the programmable threshold T1 of HSB ECC errors. An example of a reset event includes configuring the HSB to switch to using spare lane. This takes time, so the second mode covers errors until the SMI handler can setup both ends of the HSB bus to use the spare lane, then switch from the second mode to the first mode.

As indicated at a decision block 312, a method allows recovery of a uncorrectable error when operating in the HSB ECC Bypass or the first mode. When an uncorrectable error (UE) is detected by the DRAM ECC at decision block 312, checking for a correctable error reported by the HSB ECC is performed as indicated at a decision block 314. When the HSB ECC at decision block 314 does not report a correctable error, then the hardware of memory controller 106 checkstops as indicated at a block 315.

When an uncorrectable error (UE) is detected by the DRAM ECC at decision block 312 and a correctable error is reported by the HSB ECC as indicated at a decision block 314, then the error is highly probable to be the alignment of a correctable DRAM ECC error with that of a correctable HSB ECC error. In this case, the hardware of memory controller 106 does not checkstop but rather, is arranged to squash the data, for example, similar to what would be done if an UE were obtained when operating in mirrored mode, and switch to the second mode, and re-issue the read request to the same memory port as indicated at a block 316. As before, when a reset event is identified at decision block 310, then a switch from the second mode to the first mode is provided.

While the present invention has been described with reference to the details of the embodiments of the invention shown in the drawing, these details are not intended to limit the scope of the invention as claimed in the appended claims.

What is claimed is:

1. A method for implementing minimized latency and maximized reliability when data traverses multiple buses using a memory controller in a computer system comprising the steps of:
providing a dynamic random access memory (DRAM) error correcting code (ECC) checking and correcting circuit and a high speed bus (HSB) ECC checking and correcting circuit in the memory controller;
selectively operating the memory controller in a first mode for implementing minimized latency, said first mode including applying read data directly to the DRAM ECC checking and correcting circuit, bypassing the HSB ECC checking and correcting circuit;
selectively operating the memory controller in a second mode for implementing maximized reliability, said second mode including applying read data through said HSB ECC checking and correcting circuit to the DRAM ECC checking and correcting circuit; and
enabling recovery of an uncorrectable error when operating in the first mode by dynamically switching to the second mode.

2. The method for implementing minimized latency and maximized reliability as recited in claim 1 includes maintaining error statistics including HSB ECC error statistics and DRAM ECC error statistics while selectively operating the memory controller in the first mode.

3. The method for implementing minimized latency and maximized reliability as recited in claim 2 includes comparing said HSB ECC error statistics with a predefined programmable threshold value.

4. The method for implementing minimized latency and maximized reliability as recited in claim 3 includes identifying HSB ECC errors greater than said predefined programmable threshold value, dynamically switching to the second mode.

5. A method for implementing minimized latency and maximized reliability when data traverses multiple buses using a memory controller in a computer system comprising the steps of:
providing a dynamic random access memory (DRAM) error correcting code (ECC) checking and correcting circuit and a high speed bus (HSB) ECC checking and correcting circuit in the memory controller;
selectively operating the memory controller in a first mode for implementing minimized latency, said first mode including applying read data directly to the DRAM ECC checking and correcting circuit, bypassing the HSB ECC checking and correcting circuit;
selectively operating the memory controller in a second mode for implementing maximized reliability, said second mode including applying read data through said HSB ECC checking and correcting circuit to the DRAM ECC checking and correcting circuit; and
detecting an uncorrectable error by the DRAM ECC checking and correcting circuit while selectively operating the memory controller in the first mode.

6. The method for implementing minimized latency and maximized reliability as recited in claim 5 further includes detecting a correctable error by the HSB ECC checking and correcting circuit.

7. The method for implementing minimized latency and maximized reliability as recited in claim 6 further includes dynamically switching to the second mode.

8. The method for implementing minimized latency and maximized reliability as recited in claim 7 further includes re-issuing a read request to a memory port for said read data including the detected uncorrectable error by the DRAM ECC checking and correcting circuit and the detected correctable error by the HSB ECC checking and correcting circuit.

9. A memory controller for implementing minimized latency and maximized reliability when data traverses multiple buses comprising:
a dynamic random access memory (DRAM) error correcting code (ECC) checking and correcting circuit;
a high speed bus (HSB) ECC checking and correcting circuit;
multiplexer means for selectively operating the memory controller in a first mode for implementing minimized latency, said first mode including applying read data directly to the DRAM ECC checking and correcting circuit, bypassing the HSB ECC checking and correcting circuit;
said multiplexer means for selectively operating the memory controller in a second mode for implementing maximized reliability, said second mode including applying read data though said HSB ECC checking and correcting circuit to the DRAM ECC checking and correcting circuit; and
at least one HSB ECC error statistics module for maintaining HSB ECC error statistics.

10. The memory controller for implementing minimized latency and maximized reliability as recited in claim 9 includes a DRAM ECC error statistics and compare logic for maintaining DRAM ECC error statistics and comparing HSB ECC error statistics.

11. The memory controller for implementing minimized latency and maximized reliability as recited in claim 10 wherein said DRAM ECC error statistics and compare logic includes multiplexer control means for dynamically switching to the second mode responsive to identifying HSB ECC errors greater than a predefined programmable threshold value.

12. The memory controller for implementing minimized latency and maximized reliability as recited in claim 10 wherein said DRAM ECC error statistics and compare logic includes multiplexer control means for dynamically switching to the second mode responsive to the DRAM ECC checking and correcting circuit detecting an uncorrectable error and the HSB ECC checking and correcting circuit detecting a correctable error while selectively operating the memory controller in the first mode.

* * * * *